United States Patent [19]

Wolfe et al.

[11] 4,441,317

[45] Apr. 10, 1984

[54] PISTON AND CYLINDER TYPE THERMAL DEVICE PART THEREFOR AND METHODS OF MAKING THE SAME

[75] Inventors: Denis G. Wolfe, Chesterfield County, Va.; Naohisa Wada, Kawasaki, Japan

[73] Assignee: Robertshaw Controls Company, Richmond, Va.

[21] Appl. No.: 321,550

[22] Filed: Nov. 16, 1981

[51] Int. Cl.³ .............................................. F03G 7/06
[52] U.S. Cl. ...................................... 60/527; 184/25; 92/153
[58] Field of Search ...................... 184/24, 25; 92/153; 60/527, 530, 531

[56] References Cited

U.S. PATENT DOCUMENTS

| | | | |
|---|---|---|---|
| 779,700 | 1/1905 | Fogh | 184/25 |
| 897,448 | 9/1908 | Blake | 184/25 |
| 986,029 | 3/1911 | Steinert | 184/25 |
| 3,046,787 | 7/1962 | Wagner | 73/368.3 |
| 3,308,668 | 3/1967 | Wong | 60/527 |
| 3,403,559 | 10/1968 | Janous | 60/527 |
| 3,719,085 | 3/1973 | Sliger | 73/368.3 |
| 3,762,384 | 10/1973 | Day et al. | 123/119 A |
| 4,095,470 | 6/1978 | Sliger | 73/368 |

*Primary Examiner*—Allen M. Ostrager
*Attorney, Agent, or Firm*—Candor, Candor & Tassone

[57] ABSTRACT

A piston and cylinder type thermal device and method of making the same are provided, the device having a cylinder member carrying a piston stem that has an outer end that projects out of the opening of an end of the cylinder member to be extended and retracted relative thereto upon changes of sensed temperature of a charge of material disposed in the cylinder member that operatively acts on a resilient stem seat disposed in the cylinder member and having an opening at one end thereof that receives an inner end of the stem therein. The stem has a lubricant thereon to tend to prevent abrasion between the stem and the seat during the extended and retracted movement therebetween. A lubricant storage unit is carried by the device and has therein a porous member with the lubricant absorbed therein and being operatively associated with the stem for applying the lubricant to the stem external of the end of the cylinder member during movement of the stem relative to the stem seat. The lubricant storage unit comprises a cup-shaped member having a closed end and an open end with the open end being telescoped on and secured to the end of the cylinder member in such a manner that the porous member is placed under axial compression between and against the end of the cylinder member and the closed end of the cup-shaped member.

10 Claims, 3 Drawing Figures

PISTON AND CYLINDER TYPE THERMAL DEVICE PART THEREFOR AND METHODS OF MAKING THE SAME

BACKGROUND OF THE INVENTION

1. Field of the Invention

This invention relates to an improved piston and cylinder type thermal device, a self-contained lubricant storage and applying means therefor and to methods of making the same.

2. Prior Art Statement

It is known to provide a piston and cylinder type thermal device having a cylinder member carrying a piston stem that has an outer end that projects out of an opening of an end of the cylinder member to be extended and retracted relative thereto upon changes of sensed temperature of a charge of material disposed in the cylinder member that operatively acts on a resilient stem seat disposed in a cylinder member and having an opening in one end thereof that receives an inner end of the stem therein, the stem having a lubricant thereon to tend to prevent abrasion between the stem and the seat during the extended and retracted movements therebetween. For example, see the U.S. patent to Wagner, U.S. Pat. No. 3,046,787 and the U.S. patent to Sliger, U.S. Pat. No. 3,719,085.

Also, see the U.S. patent to Sliger, U.S. Pat. No. 4,095,470 which, in addition to the above structure, has a seal member at the end of the cylinder member to scrape contaminants from the outer end of the stem to prevent the contaminants from entering into the cylinder member during the extending and retracting movement of the stem relative to the cylinder member.

It is also known to provide porous washer-like members impregnated with a lubricant and held in a rigid annular fixed housing for sealing against a reciprocating valve stem passing therethrough. For example see the U.S. patent to Day et al, U.S. Pat. No. 3,762,384.

SUMMARY OF THE INVENTION

It is one feature of this invention to provide an improved piston and cylinder type thermal device.

In particular, it has been found according to the teachings of this invention that a conventional piston and cylinder type thermal device has sufficient lubricant initially disposed on the stem thereof to provide a relatively long life of the device for automotive radiator thermostat purposes and the like.

However, it was found that when it was desired to utilize such conventional piston and cylinder type thermal device for operating a certain type valve wherein the full stroke of the stem is required for each cycle of operation of the device, the life of such device is inadequate because such full stroke operation causes early loss of the lubricant. When the lubricant surrounding the stem is lost, abrasion of the rubber or resilient stem seat results causing a loss of stroke length or end of life of the thermal device.

In particular, it has been found that the resulting abraded rubber particles created by the movement between the dry stem and the stem seat leave the device and cause a loss of volume of the rubber stem seat. Thus, since the rubber stem seat acts as a fluid within the thermal device and a certain amount of this fluid is now lost, a shorter stroke of its stem results.

Accordingly, it was found according to the teachings of this invention that a self-contained lubricant storage and applying means can be readily carried by such conventional piston and cylinder type thermal device to continuously supply lubricant to the stem so that the device can have full stroke cycles and still have adequate life for valve operator use or the like.

For example, one embodiment of this invention provides a piston and cylinder type thermal device having a cylinder member carrying a piston stem that has an outer end that projects out of an opening of an end of the cylinder member to be extended and retracted relative thereto upon changes of sensed temperature of a charge of material disposed in the cylinder member that operatively acts on a resilient stem seat disposed in the cylinder member and having an opening in one end thereof that receives an inner end of the stem therein, the stem having a lubricant thereon to tend to prevent abrasion between the stem and the seat during the extended and retracted movement therebetween. A lubricant storage means is carried by the device and has therein porous means with the lubricant absorbed therein and being operatively associated with the stem for applying the lubricant to the stem external of the end of the cylinder member during the movement of the stem relative to the stem seat. The lubricant storage means comprises a cup-shaped member having a closed end and an open end with the open end of the cup-shaped member being telescoped on the one end of the cylinder member and having means securing the open end to the end of the cylinder member. The porous means is under axial compression between and against the end of the cylinder member and the closed end of the cup-shaped member.

Accordingly, it is an object of this invention to provide an improved piston and cylinder type thermal device having one or more of the novel features of this invention as set forth above or hereinafter shown or described.

Another object of this invention is to provide a method of making such a piston and cylinder type thermal device, the method of this invention having one or more of the novel features of this invention as set forth above or hereinafter shown or described.

Another object of this invention is to provide a self-contained lubricant storage and applying means for a piston and cylinder type thermal device and having one or more of the novel features of this invention as set forth above or hereinafter shown or described.

Another object of this invention is to provide a method of making such a self-contained lubricant storage and applying means, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
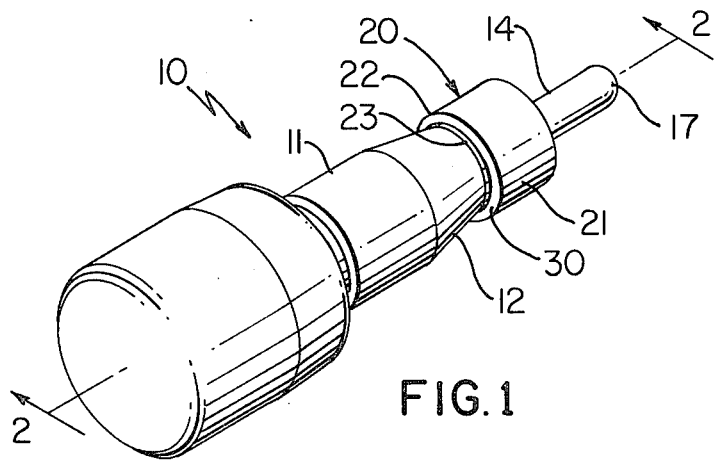
FIG. 1 is a perspective view of the improved piston and cylinder type thermal device of this invention.

While the various features of this invention are hereinafter described and illustrated as being particularly adapted to provide a piston and cylinder type thermal device adapted to provide full stroke of the stem for each cycle of operation thereof in order to operate valving structure and the like that require a relatively large movement thereof, it is to be understood that the various features of this invention can be utilized singly or in any combination thereof to provide a piston and cylinder type thermal device that is only required to have a partial stroke of the stem thereof each cycle of operation thereof and/or can be utilized for operating other structure as desired.

Therefore, this invention is not to be limited to only the embodiment illustrated in the drawings, because the drawings are merely utilized to illustrate one of the wide variety of uses of this invention.

Figure 2:
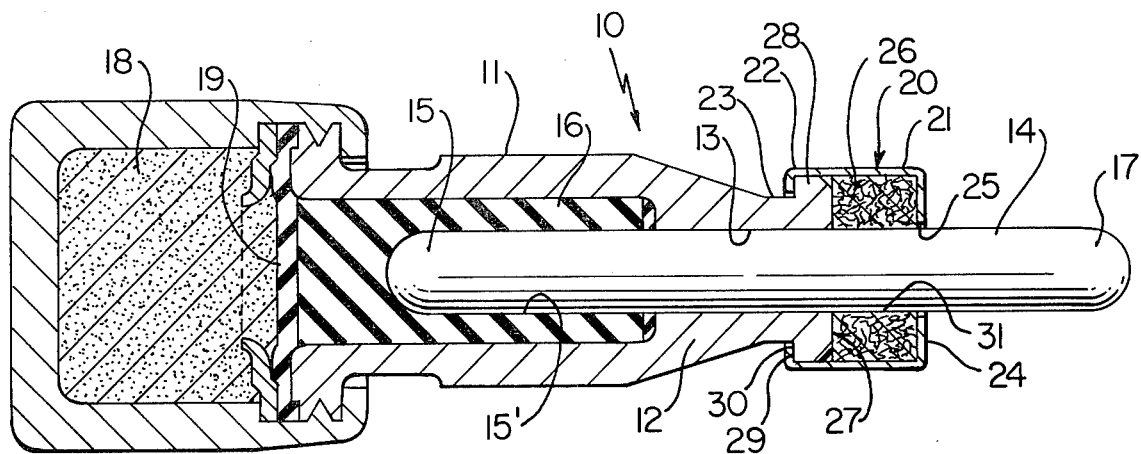
FIG. 2 is an enlarged cross-sectional view of the thermal device of FIG. 1 and is taken in the direction of the arrows 2—2 of FIG. 1.
Figure 3:
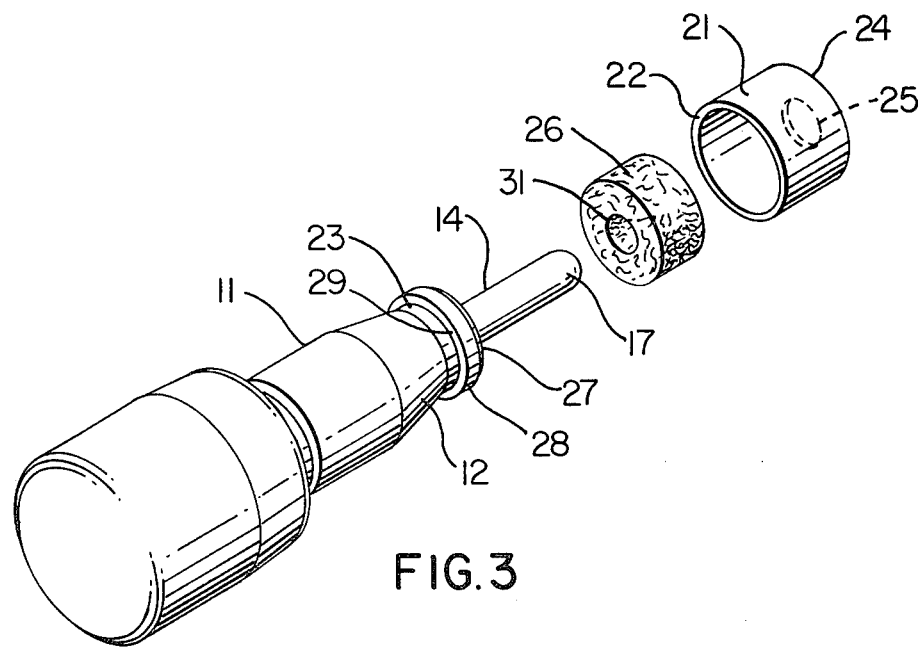
FIG. 3 is an exploded perspective view of various parts of the thermal device of FIG. 1.

Referring now to FIGS. 1 and 2, the improved piston and cylinder type thermal device of this invention is generally indicated by the reference numeral 10 and comprises a cylinder member 11 having a guide end 12 provided with an opening 13 passing therethrough and receiving a piston member or stem 14 that has one end 15 disposed within an opening 15' in one end of a rubber or resilient stem seat 16 located inside the cylinder member 11 while the other end 17 of the stem 14 extends out of the opening 13 as illustrated to operate any desired structure in a manner well known in the art.

A wax charge 18 or the like is disposed in the cylinder member 11 and through a flexible diaphragm 19 is adapted to, in effect, act against the resilient stem seat 16 in a push manner and, thus, on the end 15 of the stem 14 to force the stem 14 to extend further out of the opening 13 when the material 18 senses a certain temperature and thereby expands. Conversely, when the temperature being sensed by the material 18 decreases, the material 18 contracts and thereby permits the stem 14 to be retracted into the cylinder member 11 under a spring force (not shown) or the like in a manner well known in the art.

Thus, it can be seen that in each cycle of operation of the device 10, the stem 14 moves outwardly relative to the stem seat 16 and then inwardly relative to the stem seat 16 whereby there is repeated sliding movement between the end 15 of the stem 14 and the seat 16.

Since the structure of the piston and cylinder type thermal device 10 so far described is well known in the art, it is believed that further description of the details and operation thereof is unnecessary as reference can be made to the aforementioned U.S. patent to Wagner, U.S. Pat. No. 3,046,787 for the details of the structure of the resilient valve seat 16 and reference can be made to the aforementioned U.S. patent to Sliger U.S. Pat. No. 3,719,085 for the details of the structure and operation of the other parts of the device 10, whereby both U.S. Pat. Nos. 3,046,787 and 3,719,085, are being incorporated into this disclosure by this reference thereto.

However, as previously stated, when the prior known device 10 is being made, a lubricant is normally disposed on the stem 14 before the stem 14 is assembled in the stem seat 16 so that the lubricant will prevent the stem end 15 from abrading the stem seat 16 during the aforementioned extending and retracting sliding movement between the stem 14 and the seat 16 during the cycles of operation of the device 10 for automobile radiator use and the like whereby an adequate life span is provided by the device 10 for this use of the device 10.

However, it was found according to the teachings of this invention that when the device 10 is utilized to operate a valve structure wherein a full stroke of the stem 14 relative to the stem seat 16 is required for each change or cycle of operation of the device 10 by having the charge of material 18 sensing a temperature that will provide the maximum stroke of the stem 14, enough of the lubricant on the stem 14 is exposed to the atmosphere and thereby is subsequently lost so that a resulting abrasion occurs between the stem 14 and the seat 16 causing rubber particles of the stem seat 16 to break off and be carried out of the opening 13 thereof during the extending movement or stroke of the stem 14 relative to the seat 16 whereby a loss of volume of the rubber stem seat 16 results so that the desired length for the maximum stroke of the stem 14 relative to the cylinder member 11 cannot take place.

Therefore, it was found according to the teachings of this invention that a unique self-contained lubricant storage and applying means can be provided for the device 10 that would continuously supply lubricant to the stem 14 to prevent the aforementioned abrasion problem and thereby permit the device 10 to be long lasting and still provide a maximum stroke of the desired length thereof for each cycle of operation of the device 10 so that the device 10 would be satisfactory for operating valve structures and the like that require a relatively large stroke for each operation thereof.

In particular, such unique self-contained lubricant storage and applying means of this invention is generally indicated by the reference numeral 20 in the drawings and comprises a cup-shaped metallic or plastic member 21 having an open end 22 secured to the outer end 23 of the cylinder member 11 and having its closed end 24 provided with a central opening 25 therethrough and through which the end 17 of the fully retracted stem 14 extends.

The self-contained lubricant storage and applying means 20 includes a washer-like porous member 26 disposed within the cup-shaped member 21 so as to surround the end 17 of the stem 14 and be disposed completely between the closed end 24 of the cup-shaped member 21 and the outer surface 27 of the end 23 of the cylinder member 11 as illustrated, the porous member 26 being saturated with a suitable lubricant so as to not only store a supply of such lubricant, but also to apply such lubricant to the stem end 17 as the stem end 17 is moved relative thereto during the extending and retracting movement of the stem 14 relative to the stem seat 16 in the manner previously described.

In this manner, the lubricant storage and applying means 20 continuously supplies lubricant to the stem 14 during the operation of the device 10 so as to provide a long lasting cycle of operation thereof as will be apparent hereinafter.

While the porous material 26 can be any suitable material and the lubricant can be any suitable lubricant, it has been found that the porous material 26 can be felt and that the lubricant impregnated therein can be a lubricant known as "Dow Corning 710" manufactured by the Dow Corning Corporation of Midland, Mich.

While the cup-shaped member 21 of the lubricant storage means 20 of this invention can be fastened to the end 23 of the cylinder member 11 in any suitable manner, it can be seen that the end 23 of the cylinder member 11 has an annular flange 28 thereon that defines a shoulder 29 spaced from the end surface 27 of the cylinder member 11 and against which the outer portion 30 of the open end 22 of the cup-shaped member 21 can be disposed either through a conventional turning operation on the end 22 after the end 22 has been telescoped onto the flange 28 or the end portion 30 can be previously turned into the configuration illustrated in FIG. 2 and be longitudinally split so to subsequently be snap-fitted over the flange 28 as desired.

The washer-like felt member 26 can have the opening 31 that passes centrally therethrough of a size that the felt member 26 will compressively engage the end 17 of the stem 14 when the storage device 20 is assembled thereon and the outer periphery 32 of the felt washer-like member 26 can also be oversized so as to be under radial compression when the washer-like member 26 is disposed within the cup-shaped member 21, as desired.

In addition, when the cup-shaped member 21 is secured to the device 10 by having the end 30 of the cup-shaped member 21 disposed against the shoulder 29 in the manner illustrated in FIG. 2, the washer-like member 26 can be under axial compression between the surface 27 of the cylinder member 11 and the closed end 24 of the cup-shaped member 21, as desired.

In this manner, it can be seen that by having the felt member 26 under at least slight compression after its assembly to the device 10, there is always the assurance that the felt member 26 will be in good wiping engagement with the stem 14 to apply the lubricant stored within the pores of the member 26 onto the surface of the end 17 of the stem 14 for lubricating the same.

Therefore, it can be seen that it is a relatively simple method of this invention to make the self-contained lubricant storage and applying means 20 by first disposing the lubricant saturated washer-like member 26 in the cup-shaped member 21 and then assemble the same to the piston and cylinder type thermal device 11 in the manner previously set forth so as to continuously supply lubricant to stem 14 during the extending and retracting movement of the stem 14 relative to the cylinder 11 because the stem 14 likewise moves relative to the porous member 26 which will apply the lubricant stored therein to the stem 14 by a wiping action during such movement of the stem 14 relative to the porous member 26.

A test was made utilizing six identical piston and cylinder type thermal devices of which three devices did not have the self-contained lubricant storage and applying means 20 of this invention attached thereto. Each thermal device was cycled to provide and hold its maximum stroke for three minutes and then permitted to fully retract and remain in its retracted condition for eight minutes for each cycle of operation thereof. The devices that did not have the self-contained lubricant storage and applying means 20 of this invention began losing their full length strokes after about 17,000 cycles of operation and substantially completely failed after about 33,000 cycles whereas the three thermal devices with the self-contained lubricant storage and applying means 20 of this invention were still providing substantial full length strokes after the 33,000 cycles of operation thereof.

Because the lubricant storage and applying means 20 of this invention are self-contained and adapted to be detachably secured to the cylinder members of the thermal devices, the same are readily adapted to be utilized in the field to not only replace used lubricant storage and applying means 20, but also to convert already operating thermal devices into the improved thermal devices 10 of this invention.

Therefore, it can be seen that this invention not only provides an improved piston and cylinder type thermal device and a self-contained lubricant storage and applying means therefor, but also this invention provides methods for making same.

While the forms and methods of this invention now preferred have been illustrated and described as required by the Patent Statute, it is to be understood that other forms and method steps can be utilized and still fall within the scope of the appended claims.

What is claimed is:

1. In a piston and cylinder type thermal device having a cylinder member carrying a piston stem that has an outer end that projects out of an opening of an end of said cylinder member to be extended and retracted relative thereto upon changes of sensed temperature of a charge of material disposed in said cylinder member that operatively acts on a resilient stem seat disposed in said cylinder member and having an opening in one end thereof that receives an inner end of said stem therein, said stem having a lubricant thereon to tend to prevent abrasion between said stem and said seat during said extended and retracted movement therebetween, lubricant storage means carried by said device and having therein porous means with said lubricant absorbed therein and being operatively associated with said stem for applying said lubricant to said stem external of said end of said cylinder member during said movement of said stem relative to said stem seat, the improvement wherein said lubricant storage means comprises a cup-shaped member having a closed end and an open end, said open end of said cup-shaped member being telescoped on said end of said cylinder member and having means securing said open end to said end of said cylinder member, said porous means being under axial compression between and against said end of said cylinder member and said closed end of said cup-shaped member.

2. A piston and cylinder type thermal device as set forth in claim 1 wherein said closed end of said cup-shaped member has an opening therethrough and through which said outer end of said stem projects.

3. A piston and cylinder type thermal device as set forth in claim 2 wherein said porous means comprises a washer-shaped member having said outer end of said stem passing substantially medially therethrough, said porous means being under radial compression between and against said stem and said cup-shaped member.

4. A piston and cylinder type thermal device as set forth in claim 3 wherein said end of said cylinder member has an annular shoulder, said means of said open end of said cup-shaped member is disposed against said shoulder to secure said cup-shaped member to said cylinder member.

5. In a method of making a piston and cylinder type thermal device having a cylinder member carrying a piston stem that has an outer end that projects out of an opening of an end of said cylinder member to be extended and retracted relative thereto upon changes of sensed temperature of a charge of material disposed in said cylinder member that operatively acts on a resilient stem seat disposed in said cylinder member and having an opening in one end thereof that receives an inner end of said stem therein, said stem having a lubricant thereon to tend to prevent abrasion between said stem and said seat during said extended and retracted movement therebetween, said method comprising the steps of disposing a lubricant storage means to be carried by said device, and forming said lubricant storage means to have therein porous means with said lubricant absorbed therein said be operatively associated with said stem for applying said lubricant to said stem external of said end of said cylinder member during said movement of said stem relative to said stem seat, the improvement comprising the steps of forming said lubricant storage means from a cup-shaped member having a closed end and an open end, telescoping said open end of said cup-shaped member on said one end of said cylinder member, and securing means of said open end to said end of said cylinder member in a manner to place said porous means under axial compression between and against said end of said cylinder member and said closed end of said cup-shaped member.

6. A method of making a piston and cylinder type thermal device as set forth in claim 5 and including the step of forming said closed end of said cup-shaped member with an opening therethrough and through which said outer end of said stem projects.

7. A method of making a piston and cylinder type thermal device as set forth in claim 6 and including the steps of forming said porous means to comprise a washer-shaped member having said outer end of said stem passing substantially medially therethrough, and causing said porous means to be under radial compression between and against said stem and said cup-shaped member.

8. A method of making a piston and cylinder type thermal device as set forth in claim 7 and including the steps of forming said end of said cylinder member to have an annular shoulder, and disposing said means of said open end of said cup-shaped member against said shoulder to secure said cup-shaped member to said cylinder member.

9. A method of making a piston and cylinder type thermal device as set forth in claim 8 wherein said step of disposing said means of said open end of said cup-shaped member against said shoulder comprises the step of snap-fitting said open end of said cup-shaped member over said shoulder to secure said cup-shaped member to said cylinder member.

10. A method of making a piston and cylinder type thermal device as set forth in claim 8 wherein said step of disposing said means of said open end of said cup-shaped member against said shoulder comprises the step of turning said open end of said cup-shaped member over said shoulder to secure said cup-shaped member to said cylinder member.

* * * * *